though a preferred embodiment of the invention has been shown. [sic]

United States Patent [19]
Briggs

[11] Patent Number: 4,698,168
[45] Date of Patent: Oct. 6, 1987

[54] CORROSION INHIBITOR FOR WELL ACIDIZING TREATMENTS

[75] Inventor: Garry L. Briggs, Edmonton, Canada

[73] Assignee: Hughes Tool Company, Houston, Tex.

[21] Appl. No.: 902,356

[22] Filed: Aug. 29, 1986

[51] Int. Cl.$^4$ ............................................. E21B 43/27
[52] U.S. Cl. .................................... 252/8.553; 166/307
[58] Field of Search ....................... 252/8.553; 166/307

[56] References Cited

U.S. PATENT DOCUMENTS

| | | | |
|---|---|---|---|
| 2,814,593 | 11/1957 | Beiswanger et al. | 252/8.553 |
| 2,965,658 | 12/1960 | Kirkpatrick | 260/404 |
| 3,083,158 | 3/1963 | Markham | 252/8.553 |
| 3,107,221 | 10/1963 | Harrison et al. | 252/8.553 X |
| 3,251,415 | 5/1966 | Bombardieri et al. | 252/8.553 X |
| 3,402,770 | 9/1968 | Messenger | 252/8.552 |
| 3,404,094 | 10/1968 | Keeney | 252/8.553 |
| 3,816,322 | 6/1974 | Griffin et al. | 252/8.553 X |
| 4,163,727 | 8/1979 | Inks | 252/8.553 |
| 4,442,014 | 4/1984 | Looney et al. | 252/8.553 |

OTHER PUBLICATIONS

Riggs, Corrosion Inhibitors, National Assoc. of Corrosion Eng., 1973, pp. 7-27.

*Primary Examiner*—Herbert B. Guynn
*Attorney, Agent, or Firm*—Charles D. Gunter, Jr.

[57] ABSTRACT

A well acidizing treatment solution is shown which comprises an aqueous solution of an acid and a corrosion inhibiting composition which prevents the formation of sludge. The corrosion inhibiting composition is made up of a mixture of propargyl alcohol and cellosolve, the propargyl alcohol being present in the range from about 80–90 weight percent based on the weight of the corrosion inhibiting composition. The composition also contains as an additional ingredient a mixture of a polyglycol, amine derivatives, a phenolformaldehyde resin and tar bases.

2 Claims, No Drawings

CORROSION INHIBITOR FOR WELL ACIDIZING TREATMENTS

BACKGROUND OF THE INVENTION

1. Field of the Invention:

This invention relates to compositions and methods for acidizing subterranean formations in the vicinity of a well borehole. More specifically, the invention relates to additive compositions useful in preventing the undesirable effects associated with solubilized metal ions in the fluids used in well acidizing, such as the formation of asphaltene sludge.

2. Description of the Prior Art:

Acidization of oil-bearing strata is a well known method of increasing oil production. The main constituent of such acid treating compositions is the acid, usually hydrochloric acid, hydrofluoric acid, formic acid, acetic acid, citric acid, and mixtures thereof.

As the acid is moved from its manufacturing source to the wellbore and into the geological formation, it comes into contact with metals in various forms. Although commercial hydrochloric acid is available at a concentration of about 30 to 40 percent by weight, concentrated acid is generally diluted with water to about 15 percent for most acidizing jobs. However, acid varying in strength from about 5 to about 30 percent HCl has been used in the past. To prevent metal ions (the most common being iron) from becoming dissolved in the acid, the acid is stored in non-reactive or lined storage vessels prior to use. However, as the treatment fluid containing the acid is pumped through surface pumps and through downhole equipment in the wellbore, iron and other metals can become solubilized in the fluid.

In evaluating returning fluids from over 60 wells, we have found that concentrations of 25-35 thousand parts per million (ppm) iron had become solubilized in the initial treatment acid. We have also concluded that in performing an acid job on a well, that the treatment acid can solubilize 1,000 parts per million of total iron going through 700 meters of tubing and pumping equipment. This total iron is made up of approximately 200 ppm ferric ion ($Fe+3$) and 800 ppm ferrous ion ($Fe+2$). When treatment acid with 1000 ppm total solubilized iron contacts many crude oils with a reactive asphaltene component, an acid or oil insoluble sludge can result.

Formation damage resulting from the precipitation of asphaltene deposits from crude oil has been recognized in the petroleum industry for many years. The asphaltene fraction of the crude oil is that portion which is precipitated by the addition of a low molecular weight paraffin solvent such as N-pentane. Asphaltene particles are composed of condensed aromatic ring structures containing a significant number of heteroatoms (nitrogen, oxygen, sulfur). These particles are very reactive when put in a low pH environment. Asphaltenes in crude oil in low pH (acid) will extract metals from a mineral acid, i.e. HCl. Ferric chloride has been used to crosslink asphaltenes in the asphalt industry for many years in order to make road pavement and is another example of this phenomenon.

In order to lessen the problems associated with acid corrosion, most well acidizing treatments include corrosion inhibitors which retard or prevent the solubilization of metal ions in the treatment fluid. Those skilled in the art recognize certain criteria which a corrosion inhibitor must meet in order to be acceptable. The inhibitor should provide a high degree of protection (i.e. low corrosion rate) in the acid of choice. The inhibitor should be stable enough to provide adequate corrosion protection under any and all well treatment conditions. The inhibitor should have dispersability characteristics which allow it to go where it is needed and in the proper amounts. The inhibitor should be compatible with all acid additives to be employed in the treatment and should not cause any adverse secondary effects. It has also become apparent that the inhibitor must not effect acid injectivity and cleanup after the treatment and that the inhibitor should not contain insoluble residues that produce formation damage at bottom hole temperatures.

The classification system set out by the American Petroleum Institute in API Bulletin D-15 first ed. 1973 establishes criteria for determining the effectiveness of a corrosion inhibitors in preventing the formation of asphaltene sludge:

CLASS I - The inhibited acid solution is free and clear of any evidence of oiling emulsion, agglomeration of particles, haze, or any liquid/liquid or liquid/solid phase separation.

CLASS II - The inhibited acid solution is not clear and has a definite haze or turbidity. The solution is uniform and the inhibitor is evenly distributed in the acid phase and stable for the time reported.

CLASS III - The inhibited acid solution has definite phase separation, viz, oiling out, agglomeration, or other liquid/liquid or liquid/solid phase separation.

It is an object of the present invention to provide a corrosion inhibitor for a well acidizing treatment fluid which protects the metal equipment through which the fluid passes in the treatment process.

Another object of the invention is the provision of such a corrosion inhibitor which is stable, acid soluble and compatible with various acid additives.

Another object of the invention is to provide a corrosion inhibitor which does not produce sludge by reacting with the asphaltene component in the insitu crude oil.

SUMMARY OF THE INVENTION

These and other objects are accomplished through the use of a treatment solution which comprises an aqueous solution of an acid, the acid being present in an amount effective to increase the permeability of the formation being treated. The treatment solution contains an effective amount of a corrosion inhibiting composition which prevents the formation of sludge, the corrosion inhibiting composition comprising a mixture of propargyl alcohol and cellosolve, the propargyl alcohol being present in the range from about 80-90 weight percent based on the weight of the corrosion inhibiting composition. Preferably, the composition also contains as additional ingredients a mixture of a polyglycol, amine derivatives, a phenolformaldehyde resin and tar bases.

Additional objects, features and advantages will be apparent in the written description which follows.

DESCRIPTION OF THE PREFERRED EMBODIMENT

The acidizing treatment fluids of the invention are solutions containing one or more commonly available acids in a total acid concentration between about 10% and about 50% by weight of the treatment fluid. The individual acids will generally be present in concentrations between about 5% and about 35% by weight of treatment fluid. The preferred acids include hydrochloric, hydrofluoric, formic, acetic, citric, and mixtures thereof.

The acidizing treatment fluids also contain an effective amount of a corrosion inhibiting composition which prevents the formation of sludge. The corrosion inhibiting composition is present in the range from about 0.50 to 20.0, preferably 1.0 to 10.0, weight percent based on the weight of treatment fluid. The corrosion inhibiting composition includes, as a major constituent, from about 80–90 % based on the weight of composition of propargyl alcohol having the formula:

Propargyl alcohol is a commercially available acetylenic primary alcohol. It is a colorless, volatile liquid which is miscible with water and many organic solvents. Propargyl alcohol has a melting point of $-52$ degrees C., a boiling point of 114 degrees C. and a viscosity at 20 degrees C. in Cp of 0.0165.

The corrosion inhibiting composition also contains, as a major constituent, from about 5 to 10%, preferably 7 to 9%, by weight of composition of 2 ethoxy ethanol ($C_4H_{10}O_2$) sold under the trademark cellosolve. Cellosolve is a commercially available ethanediol ether used as a solvent in various chemical processes and is familiar to those skilled in the art.

The preferred corrosion inhibiting composition also contains minor amounts of a polyglycol, an alkyl phenol formaldehyde resin, quinolium, isoquinolium and tarbases.

The preferred polyglycol has the formula:

$$HO(C_2H_4O)_nH$$

where "n"=2 to 6.

The polyglycol is preferably present in the range from about 0.5 to 3.0 weight percent, most preferably 1.0 to 2.0 percent.

The preferred phenol formaldehyde resin has the chemical formula:

$$(C_{15}H_{24}OC_2H_4CH_2O)_x$$

where x=2 to 8.

The phenol formaldehyde resin is preferably present in the range from 0.5 to 3.0 weight percent, most preferably 1.0 to 2.0 weight percent.

The quinolinium constituents include 2-(phenylmethyl)chloride isoquinolinium ($C_{16}H_{14}NCl$), preferably present in the range from 0.5 to 3.0 weight percent, most preferably 1.0 to 2.0 weight percent; 1-(phenylmethyl)quinolinium ($C_{16}H_{14}NCl$), preferably present in the range from 0.25 to 2.0 weight percent, most preferably 0.5 to 1.0 weight percent; 2 methyl-1-(phenylmethyl) chloride quinolinium ($C_{17}H_{16}NCl$), preferably present in the range from 0.25 to 2.0 weight percent, most preferably 0.5 to 1.0 weight percent; and 4 methyl-1-(phenylmethyl)chloride quinolinium ($C_{17}H_{16}NCl$), preferably present in the range from 0.25 to 2.0 weight percent, most preferably 0.5 to 1.0 weight percent.

A specific preferred composition is shown in Table I below:

TABLE I (ALL WEIGHT % BASED ON TOTAL WEIGHT OF INHIBITOR COMPOSITION)

| WT. % RANGE | PREF. WT. % | ACS NO. | CHEMICAL NAME | CHEMICAL FORMULA |
|---|---|---|---|---|
| 80–90 | 85–88% | 107-19-7 | 2 PROPYN-1-OL | $C_3H_4O$ |
| 5–10 | 7–9% | 110-80-5 | ETHANOL, 2 ETHOXY | $C_4H_{10}O_2$ |
| 0.5–3.0 | 1–2% | 25322-68-3 | POLYGLYCOL | $HO(C_2H_4O)n\ H$ $n = 2-6$ |
| 0.5–3.0 | 1–2% | 30846-35-6 | PHENOL, 4-NONYL, POLYMER FORMALDEHYDE AND OXIRANE | $(C_{15}H_{24}O\ C_2H_4O\ CH_2O)x$ |
| 0.05–2.0 | ½–1% | 91082-51-8* | TARBASES, COAL, CRUDE, BENZYL CHLORIDE-QUATERNIZED | — |
| 0.5–3.0 | 1–2% | 35674-56-7 | ISOQUINOLINIUM, 2 - (PHENYLMETHYL) CHLORIDE | $C_{16}H_{14}N\ Cl$ |
| 0.05–2.0 | ½–1% | 15619-48-4 | QUINOLINIUM, 1 - (PHENYLMETHYL) | $C_{16}H_{14}N\ Cl$ |
| 0.05–2.0 | ½–1% | 68784-95-2 | QUINOLINIUM, 2 METHYL-1-(PHENYLMETHYL) CHLORIDE | $C_{17}H_{16}N\ Cl$ |
| 0.05–2.0 | ½–1% | 52181-07-4 | QUINOLINIUM, 4 METHYL-1-(PHENYLMETHYL) CHLORIDE | $C_{17}H_{16}N\ Cl$ |

In developing the preferred corrosion inhibitor, it was discovered that the range of propargyl alcohol utilized is critical in providing a corrosion inhibitor with the desired combination of characteristics. In order to illustrate the effect of varying the concentration of propargyl alcohol, a test blend (Blend One) was formulated containing all of the ingredients of the preferred composition but with the propargyl alcohol being present in the range from about 35 to 38 weight percent. The results of corrosion tests comparing Blend One to Applicants prior art commercially available corrosion inhibitors (Blend 15 and Blend 22) are given in Table II and Table III:

TABLE II

ALL TEMPERATURES WERE AT 20° C.

| BLEND IN 15% HCl | LOADING LEVEL OF CORROSION INHIBITOR | WEIGHT LOSS IN LBS/FT AT 13.5 HOURS | WEIGHT LOSS IN LBS/FT$^2$ AT 13.5 HOURS ACID-CORROSION INHIBITOR BLENDED FOR 24 HOURS | WEIGHT LOSS IN LBS/FT$^2$ AT 13.5 HOURS ACID-CORROSION INHIBITOR BLENDED FOR ONE WEEK |
|---|---|---|---|---|
| BLEND 1  | 1 1/1000 1 HCl | .00488 | .00490 | .00487 |
| BLEND 15 | 1 1/1000 1 HCl | .00071 | .00068 | .00073 |
| BLEND 22 | 1 1/1000 1 HCl | .00083 | .00081 | .00086 |
| BLEND 1  | 2 1/1000 1 HCl | .0078  | .0080  | .0076  |
| BLEND 15 | 2 1/1000 1 HCl | .00666 | .00668 | .0067  |
| BLEND 22 | 2 1/1000 1 HCl | .00103 | .00110 | .0013  |

TABLE III

| BLEND IN 28% HCl | LOADING LEVEL OF CORROSION INHIBITOR | WEIGHT LOSS IN LBS/FT AT 4 HOURS | WEIGHT LOSS IN LBS/FT$^2$ AT 4 HOURS ACID-CORROSION INHIBITOR BLENDED FOR 24 HOURS | WEIGHT LOSS IN LBS/FT$^2$ AT 4 HOURS ACID-CORROSION INHIBITOR BLENDED FOR ONE WEEK |
|---|---|---|---|---|
| BLEND 1  | 1 1/1000 1 HCl | .00056 | .00059 | .00060 |
| BLEND 15 | 1 1/1000 1 HCl | .00034 | .00030 | .00036 |
| BLEND 22 | 1 1/1000 1 HCl | .00118 | .0012  | .0011  |
| BLEND 1  | 2 1/1000 1 HCl | .0002  | .00024 | .00025 |
| BLEND 15 | 2 1/1000 1 HCl | .00012 | .00018 | .00014 |
| BLEND 22 | 2 1/1000 1 HCl | .00010 | .00016 | .00015 |

Blend one proved to be totally soluble and gave a "Class-I" fluid but did not achieve the desired corrosion level of the prior art blends (Blend 15 and Blend 22). While the prior art blends (Blends 15 and 22) gave good levels of corrosion protection, they both were "Class-III" fluids, i.e., they oiled out, were not compatible with anionic surfactants, and adversely affected the formation by causing asphaltene flocculation problems.

Various acetylenic alcohols were then tested as additional ingredients in an attempt to increase the corrosion inhibiting characteristics of the formulation. Only propargyl alcohol was found to increase the corrosion inhibiting characteristics of the formulation without at the same time flocculating asphaltenes. A determination was next made of the optimum concentration of propargyl alcohol to be used and the results are given in Table IV:

TABLE IV

ALL BLENDS TESTED WITH 28% HCl.
150 ML OF ACID WITH CORROSION INHIBITOR
LOADED AT 20 LITERS/1000 LITERS ACID
TEST TIME 6 HOURS
TEST TEMPERATURE 95° C.

| CORROSION INHIBITOR BLEND 1 PLUS % BY VOL. OF PROPAGYL ALCOHOL | WEIGHT LOSS IN LB/SQUARE FOOT OF J-55 COUPON |
|---|---|
| 1. 10% | .01344 |
| 2. 10% | .01553 |
| 3. 20% | .01309 |
| 4. 20% | .01286 |
| 5. 50% | .00633* |
| 6. 50% | .00597* |
| 7. 60% | .01173 |
| 8. 60% | .01448 |
| 9. 80% | .01289 |
| 10. 80% | .01204 |

*THESE ARE ACCEPTABLE CORROSION LEVELS

Comparative tests were then performed between the final formulation (Blend One +50% propargyl alcohol) and the prior art blends (Blend 15 and Blend 22) and the results are given in Table V.

TABLE V

| ACID BLEND 28% HCl | HOURS | INHIBITOR CONCENTRATION (1/m$^3$) | CORROSION LOSS LB/SQ. FT. AT 95° C. WITH J-55 COUPONS |
|---|---|---|---|
| BLEND 15 | 8 | 5 | .127 |
| BLEND 15 | 8 | 10 | .016 |
| BLEND 15 | 24 | 5 | 1.311 |
| BLEND 15 | 24 | 10 | .650 |
| BLEND 22 | 8 | 5 | .328 |
| BLEND 22 | 8 | 10 | .164 |
| BLEND 22 | 24 | 5 | 2.150 |
| BLEND 22 | 24 | 10 | 1.275 |
| BLEND 1 + 50% PA | 8 | 5 | .165 |
| BLEND 1 + 50% PA | 8 | 10 | .095 |
| BLEND 1 + 50% PA | 24 | 5 | 1.489 |
| BLEND 1 + 50% PA | 24 | 10 | .711 |

An invention has been provided with several advantages. The corrosion inhibiting composition of the invention exhibits good corrosion inhibiting characteristics and at the same time gives a "Class-I" fluid which does not flocculate asphaltenes and leave sludge in the formation. The composition is compatible with traditional additives used in acidizing formulations and does not cause any adverse secondary effects. The inhibitor is also stable under all well treatment conditions.

The invention has been shown in only one of its forms. It should be apparent to those skilled in the art that it is not so limited, but is susceptible to various changes and modifications without departing from the spirit thereof.

I claim:

1. A treatment fluid useful for increasing the permeability of a subterranean formation in the vicinity of a borehole penetrating the formation, comprising:
   an aqueous solution of an acid selected from the group consisting of hydrochloric acid, hydrofluoric acid, formic acid, acetic acid, citric acid, and mixtures thereof, the acid being present in an amount effective to increase the permeability of the formation being treated; and an effective amount of a corrosion inhibiting composition which prevents the formation of sludge, the corrosion inhibiting composition comprising a mixture of:

80–90 weight percent propargyl alcohol;

5–10 weight percent 2 ethoxy ethanol;

0.5–3.0 weight percent polyethylene glycol having the structural formula:

$$HO(C_2H_4O)_nH$$

where $n = 2-6$;

0.5–3.0 weight percent 4-nonyl phenol polymer with formaldehyde and oxirane;

0.05–2.0 weight percent tarbases;

0.5–3.0 weight percent 2-(phenylmethyl)isoquinolinium chloride;

0.05–2.0 weight percent 1-(phenylmethyl)quinolinium chloride;

0.05–2.0 weight percent 2 methyl-1-(phenylmethyl) quinolinium chloride;and 0.05–2.0 weight percent 4 methyl-1- (phenylmethyl) quinolinium chloride, all weight percents being based on the total weight of corrosion inhibiting composition.

2. A treatment fluid useful for increasing the permeability of a subterranean formation in the vicinity of a borehole penetrating the formation, comprising:

an aqueous solution of an acid selected from the group consisting of hydrochloric acid, hydrofluoric acid, formic acid, acetic acid, citric acid, and mixtures thereof, the acid being present in a total acid concentration of about 5 to 50 weight percent, based on the total weight of aqueous solution, the acid concentration being effective to increase the permeability of the formation being treated; and an effective amount of a corrosion inhibiting composition which prevents the formation of sludge, the corrosion inhibiting composition comprising a mixture of:

80–90 weight percent propargyl alcohol;

5–10 weight percent 2 ethoxy ethanol;

0.5–3.0 weight percent polyethylene glycol having the structural formula:

$$HO(C_2H_4O)_nH$$

where $n = 2-6$;

0.5–3.0 weight percent 4-nonyl phenol polymer with formaldehyde and oxirane;

0.05–2.0 weight percent tarbases;

0.05–3.0 weight percent 2-(phenylmethyl)isoquinolinium chloride;

0.05–2.0 weight percent 1-(phenylmethyl)quinolinium chloride;

0.05–2.0 weight percent 2 methyl-1-(phenylmethyl)quinolinium chloride; and 0.05–2.0 weight percent 4 methyl-1-(phenylmethyl)quinolinium chloride, all weight percents being based on the total weight of corrosion inhibiting composition, the corrosion inhibiting composition being present in the range from 0.5 to 15 weight percent based on the total weight of treatment fluid.

* * * * *